(12) United States Patent
Tada

(10) Patent No.: US 10,744,609 B2
(45) Date of Patent: Aug. 18, 2020

(54) DUST COLLECTOR FOR ELECTRIC POWER TOOL AND ELECTRIC POWER TOOL

(71) Applicant: MAKITA CORPORATION, Anjo-shi, Aichi (JP)

(72) Inventor: Yoshiro Tada, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 16/263,380

(22) Filed: Jan. 31, 2019

(65) Prior Publication Data

US 2019/0291226 A1 Sep. 26, 2019

(30) Foreign Application Priority Data

Mar. 22, 2018 (JP) ................................. 2018-054902

(51) Int. Cl.
*B23D 45/16* (2006.01)
*B23Q 11/00* (2006.01)
*B25F 5/00* (2006.01)

(52) U.S. Cl.
CPC ...... *B23Q 11/0046* (2013.01); *B23Q 11/0071* (2013.01); *B25F 5/00* (2013.01)

(58) Field of Classification Search
CPC ... B23Q 11/0046; B23Q 11/0071; B25F 5/00; A47L 17/0095
See application file for complete search history.

(56) References Cited

U.S. PATENT DOCUMENTS

| | | | | |
|---|---|---|---|---|
| 3,877,900 A | * | 4/1975 | Mitchell | A47L 7/0095 55/366 |
| 4,072,483 A | * | 2/1978 | Doyle, Jr. | A47L 5/365 15/347 |
| 4,928,348 A | * | 5/1990 | Clayton | B08B 15/026 15/345 |
| 5,904,160 A | * | 5/1999 | Wright | A47L 5/24 134/21 |
| 6,101,666 A | * | 8/2000 | Cheng | A47L 7/0047 15/301 |
| 6,530,114 B2 | * | 3/2003 | Bailey | A47L 9/2842 15/310 |

(Continued)

FOREIGN PATENT DOCUMENTS

JP 5475514 B2 4/2014

*Primary Examiner* — Omar Flores Sanchez
(74) *Attorney, Agent, or Firm* — Oliff PLC

(57) ABSTRACT

A dust collector for electric power tool includes a casing, a ring-shaped suction opening, a dust collecting route, and a filter. The suction opening protrudes forward from the casing. The tool bit of the electric power tool is insertable into the suction opening in a state where the suction opening is brought into contact with a surface to be processed. The dust collecting route is formed within the casing and guides an air suctioned from the suction opening to a dust collection portion in the casing. The filter is disposed in the dust collection portion to capture dust suctioned with the air. On the dust collecting route in the dust collection portion, a first filter and a second filter are disposed. The first filter includes a dust collecting chamber partitioned inside the dust collection portion. The second filter is arranged outside the first filter independently from the first filter.

13 Claims, 10 Drawing Sheets

(56) References Cited

U.S. PATENT DOCUMENTS

| | | | |
|---|---|---|---|
| 7,354,226 B2* | 4/2008 | Britz | B25F 5/008 408/67 |
| 7,360,275 B2* | 4/2008 | Allgeier | A47L 9/122 15/347 |
| 7,588,610 B2* | 9/2009 | Yoshida | B01D 46/4272 55/309 |
| 8,070,845 B2* | 12/2011 | Roehm | B23Q 11/0042 173/71 |
| 8,146,201 B2* | 4/2012 | Conrad | A47L 5/24 15/327.7 |
| 8,424,153 B2* | 4/2013 | Fester | A47L 9/00 15/347 |
| 8,667,638 B2* | 3/2014 | Kim | A47L 5/22 15/319 |
| 8,689,983 B1* | 4/2014 | Ripley | A47L 7/0085 15/347 |
| 8,741,013 B2* | 6/2014 | Swett | A47L 9/106 15/319 |
| 8,813,306 B2* | 8/2014 | Conrad | A47L 5/36 15/327.1 |
| 8,875,342 B2* | 11/2014 | Conrad | A47L 5/225 15/347 |
| 8,951,319 B2* | 2/2015 | Kim | B01D 45/14 15/347 |
| 9,227,201 B2* | 1/2016 | Conrad | B04C 3/00 |
| 10,507,556 B2* | 12/2019 | Machida | B01D 46/0027 |
| 2006/0107634 A1* | 5/2006 | Ohlendorf | B01D 45/08 55/385.1 |
| 2018/0311778 A1* | 11/2018 | Meiser | B23Q 11/0046 |

\* cited by examiner

DUST COLLECTOR FOR ELECTRIC POWER TOOL AND ELECTRIC POWER TOOL

BACKGROUND

This application claims the benefit of Japanese Patent Application Number 2018-054902 filed on Mar. 22, 2018, the entirety of which is incorporated by reference.

TECHNICAL FIELD

The disclosure relates to a dust collector for electric power tool that is mounted on an electric power tool such as an electric drill and a hammer drill, and an electric power tool on which the dust collector for electric power tool is mounted.

RELATED ART

On an electric power tool such as an electric drill and a hammer drill, a dust collector for electric power tool that collects and recovers dust generated from a workpiece in a drilling work and similar work is sometimes mounted. That is, the dust collector for electric power tool has a structure where a filter captures the dust to accumulate the dust in a dust box by suctioning an air that contains the dust into a casing of the dust collector for electric power tool and passing the air through the filter in the dust box as a dust collection portion (see, for example, Japanese Patent No. 5475514).

In the above-described conventional dust collector for electric power tool, a lid body of the dust box is opened to discharge the dust when the accumulated dust is disposed. At this time, the dust possibly scatters due to, for example, a posture when the lid body is opened.

Therefore, it is an object of the disclosure to provide a dust collector for electric power tool and an electric power tool that ensure effectively reducing scattering of dust at the time of disposal.

SUMMARY

In order to achieve the above-described object, there is provided a dust collector for electric power tool according to a first aspect of the disclosure. The dust collector for electric power tool includes a casing, a ring-shaped suction opening, a dust collecting route, and a filter. The casing is mountable to the electric power tool. The ring-shaped suction opening is disposed to protrude forward from the casing. A tool bit of the electric power tool is insertable into the suction opening in a state where the suction opening is brought into contact with a surface to be processed. The dust collecting route is formed within the casing. The dust collecting route guides an air suctioned from the suction opening to a dust collection portion disposed in the casing. The filter is disposed in the dust collection portion. The filter is configured to capture dust suctioned with the air. On the dust collecting route in the dust collection portion, a first filter and a second filter are each disposed. The first filter internally includes a dust collecting chamber partitioned inside the dust collection portion. The second filter is arranged outside the first filter independently from the first filter.

In the case of the first aspect of the disclosure, it is preferred that the first filter is disposed on an upstream side on the dust collecting route with respect to the second filter.

It is preferred that the first filter is coarser than the second filter.

It is preferred that the first filter is removably attachable to the dust collection portion.

It is preferred that the first filter is made of a paper.

It is preferred that the first filter is in a bag shape.

It is preferred that the dust collection portion is a dust box mounted on the casing, and the dust box includes a part of the dust collecting route and a duct to which an opening of the first filter is connected.

It is preferred that the first filter is disposed under the second filter in the dust box.

It is preferred that the dust box includes a box-shaped box main body whose top surface opens and a lid body that closes the opening of the box main body, the first filter is housed within the box main body, and the second filter is disposed on the lid body.

It is preferred that the second filter is made of a paper folded in a right-left direction in a state where a valley and a peak of a fold is in a front-rear direction.

It is preferred that the casing includes a suction passage for obtaining a suctioning force from the electric power tool in a state where the electric power tool is mounted.

It is preferred that the dust collection portion is disposed in a lower portion of the casing, and the suction passage includes a lower pipe, an upper pipe, and a flexible hose. The lower pipe has a lower end projecting toward a side of the dust collection portion. The upper pipe passes through an upper surface of the casing and has a projecting upper end. The flexible hose strides across and is connected to the lower pipe and the upper pipe.

In order to achieve the above-described object, there is provided an electric power tool that includes the mounted dust collector for electric power tool according to the first aspect of the disclosure.

With the disclosure, the first filter internally includes the dust collecting chamber partitioned inside the dust collection portion. Therefore, the dust is collectively accumulated in the collecting chamber inside the first filter. Accordingly, scattering of the dust when the dust is disposed can be effectively reduced.

In particular, with the disclosure, in addition to the above-described effect, since the first filter is disposed in the upstream side on the dust collecting route with respect to the second filter, a significant portion of the dust can be accumulated in the first filter, thereby being more preferable in preventing scattering.

In particular, with the disclosure, in addition to the above-described effect, since the first filter is coarser than the second filter, clogging is prevented to ensure a maintained air permeability of the first filter.

In particular, with the disclosure, in addition to the above-described effect, since the first filter is removably attachable to the dust collection portion, the dust can be easily disposed together with the first filter.

In particular, with the disclosure, in addition to the above-described effect, since the first filter is made of a paper, the first filter is disposable.

In particular, with the disclosure, in addition to the above-described effect, the dust box as the dust collection portion includes a part of the dust collecting route and the duct to which the opening of the first filter in a bag shape is connected. Therefore, the first filter is easily attached and removed.

In particular, with the disclosure in addition to the above-described effect, the casing includes the suction passage for obtaining a suctioning force from the electric power tool in a mounted state on the electric power tool. Therefore, for example, a motor for dust collection is not necessary, and thus, the dust collector for electric power tool can be manufactured at a low cost and a weight reduction is also achievable.

DETAILED DESCRIPTION

The following describes an embodiment of the disclosure based on the drawings.

Figure 1:
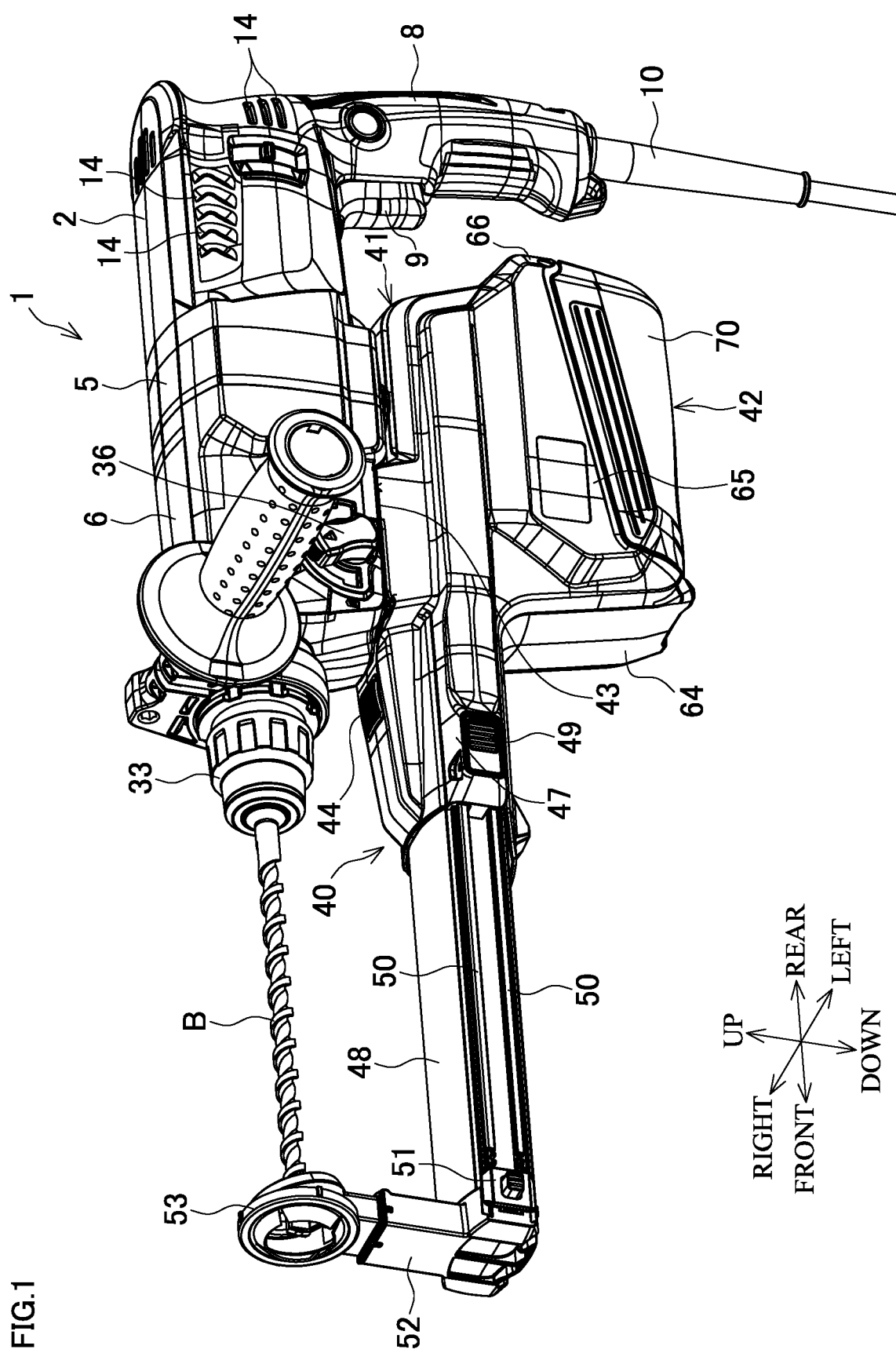
FIG. 1 is a perspective view of a hammer drill on which a dust collector for electric power tool is mounted.
Figure 2:
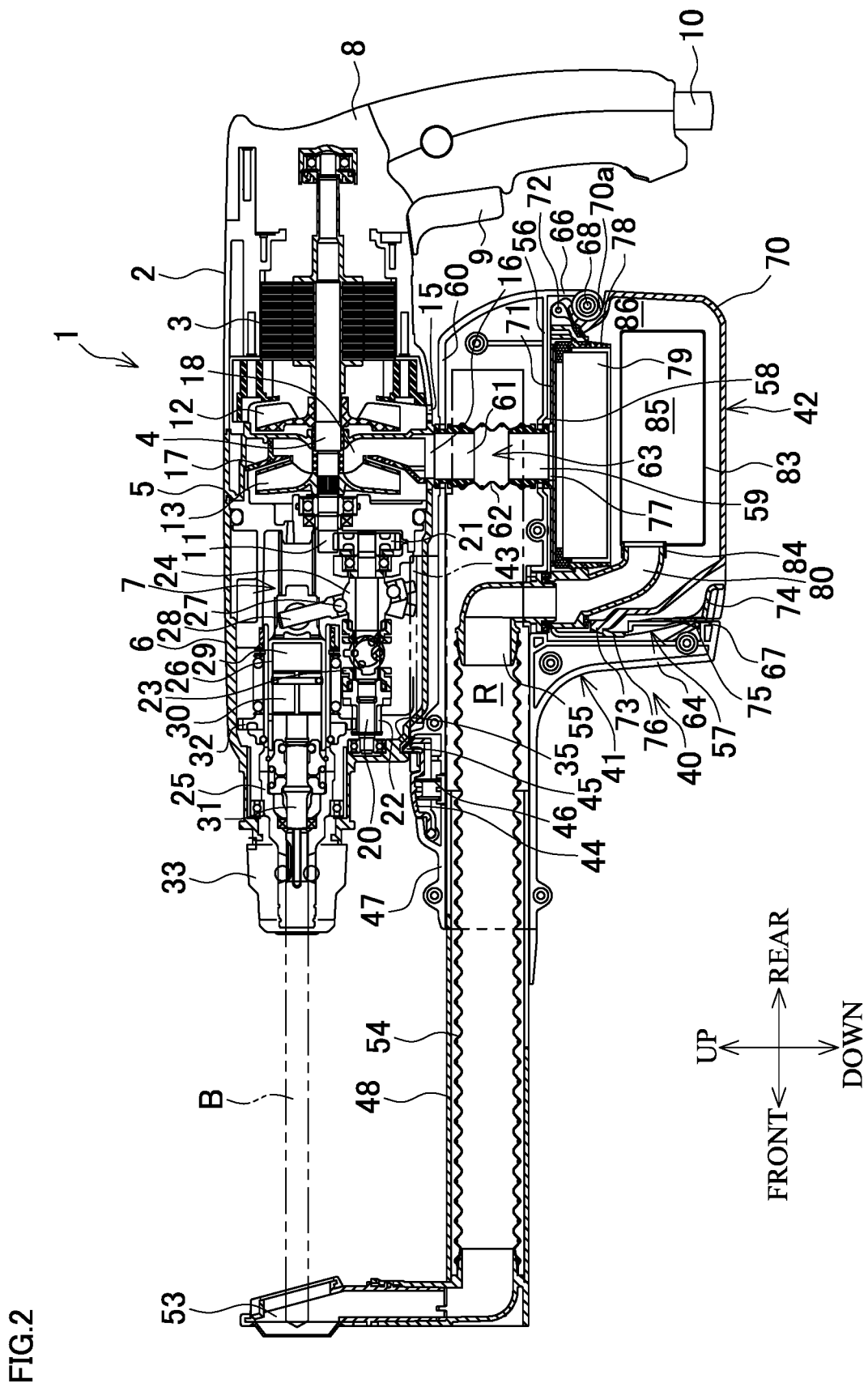
FIG. 2 is a center vertical cross-sectional view of the hammer drill on which the dust collector for electric power tool is mounted.

FIG. 1 is a perspective view in a state where a dust collector for electric power tool (hereinafter simply referred to as "dust collector") 40 is mounted on a hammer drill 1 as an exemplary electric power tool. FIG. 2 is a center vertical cross-sectional view.

Figure 3:
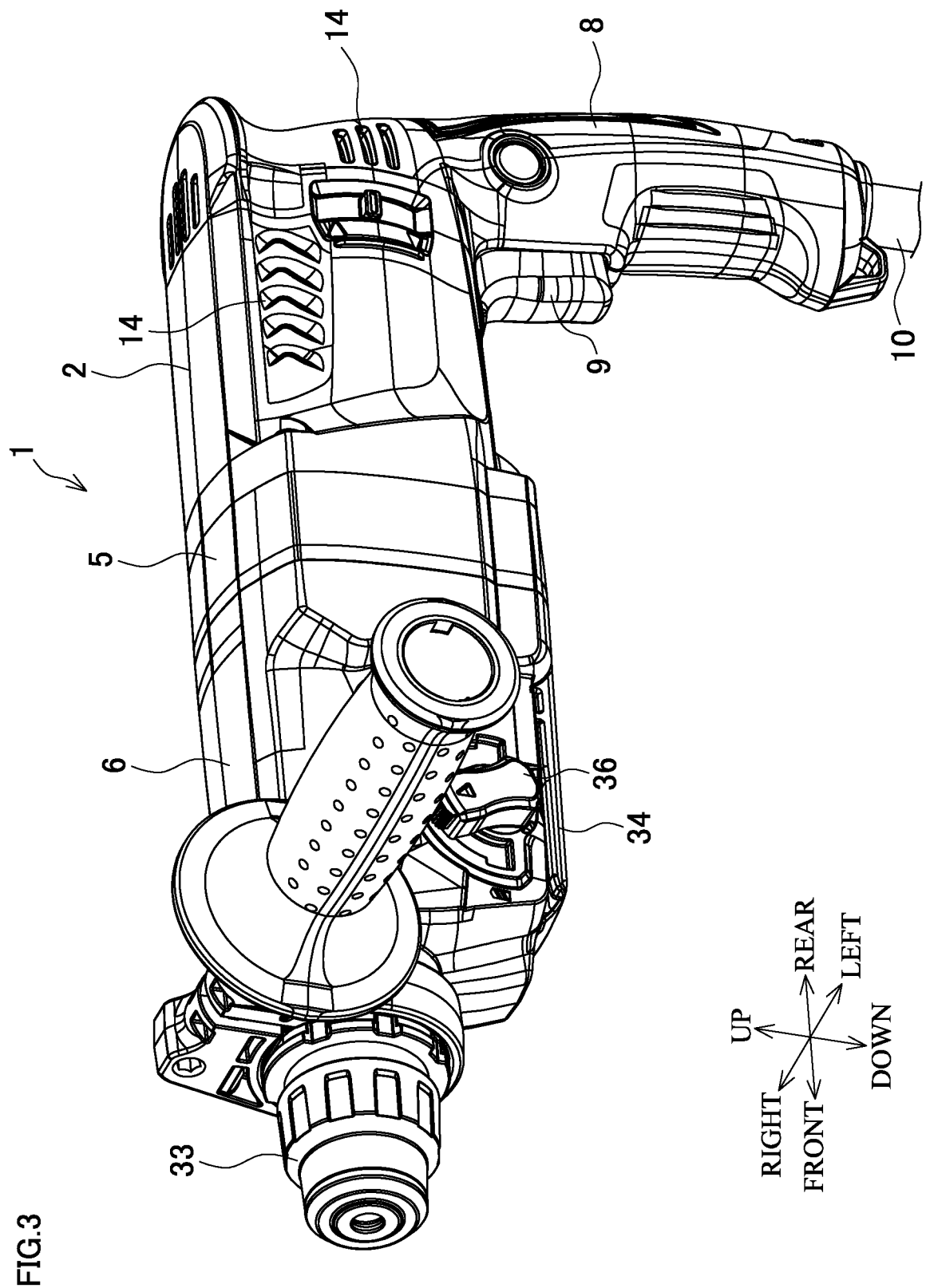
FIG. 3 is a perspective view of the hammer drill.

First, in the hammer drill 1, as illustrated in FIG. 3 as well, a pipe-shaped main body housing 6 that houses an output unit 7 is coupled to a front side of a motor housing 2 that houses a motor 3 with an output shaft 4 facing in a front-rear direction, via an intermediate housing 5. The motor housing 2 has a rear end to which a handle housing 8 that includes a switch lever 9 in a front side and houses a switch (not illustrated) is coupled downwardly. The handle housing 8 has a lower end connected to a power supply cord 10.

The output shaft 4 passes through the intermediate housing 5 to project into the main body housing 6 and has a front end on which a pinion 11 is formed. In the rear of the pinion 11, a fan for motor cooling 12 positioned within the motor housing 2 and a fan for dust collection 13 positioned within the intermediate housing 5 are disposed on the output shaft 4 back and forth. The motor housing 2 has a side surface and a lower surface on which air inlets 14 that suction a cooling air for the motor 3 and an exhaust outlet 15 are respectively formed. The intermediate housing 5 has a lower surface on which a connection port 16 connected to a suction passage 63, which will be described later, of the dust collector 40 is formed. The connection port 16 has a front side on which a baffle plate 17 that covers an outer peripheral side of the fan for dust collection 13 from behind is disposed. Accordingly, in the intermediate housing 5, an intake air chamber 18 that suctions and discharges an external air is formed. The external air is suctioned from the connection port 16 by a rotation of the fan for dust collection 13 and discharged from an exhaust outlet (not illustrated) disposed on a side surface of the intermediate housing 5.

In the output unit 7, an intermediate shaft 20 is supported in a front-rear direction within the main body housing 6. To intermediate shaft 20, a torque transmission is performed via a gear 21 that engages with the pinion 11 of the output shaft 4. The intermediate shaft 20 includes a first gear 22, a clutch 23, and a boss sleeve 24 in this order from ahead. Above the intermediate shaft 20, a tool holder 25, which has a distal end to which a bit B as a tool bit can be attached by insertion, is journaled parallelly with the intermediate shaft 20 and a piston cylinder 26 is movably inserted behind the tool holder 25. On the boss sleeve 24, an arm 28 is externally mounted via a swash bearing 27 whose axis line is inclined. The arm 28 has an upper end coupled to a rear end of the piston cylinder 26. The piston cylinder 26 internally houses a striker 30 movably back and forth via an air chamber 29, and thus, the striker 30 can hammer an impact bolt 31 disposed ahead of the striker 30. The first gear 22 engages with a second gear 32 mounted on the tool holder 25. The tool holder 25 projects ahead from the main body housing 6 and has a front end to which an operation sleeve 33 for attaching and removing the bit B is disposed.

Meanwhile, on both right and left sides in a lower portion of the main body housing 6, a pair of rails 34 that project outward are formed in the front-rear direction. The rails 34 have a center in a right-left direction in a front side on which a locking recess 35 is formed.

Figure 4:
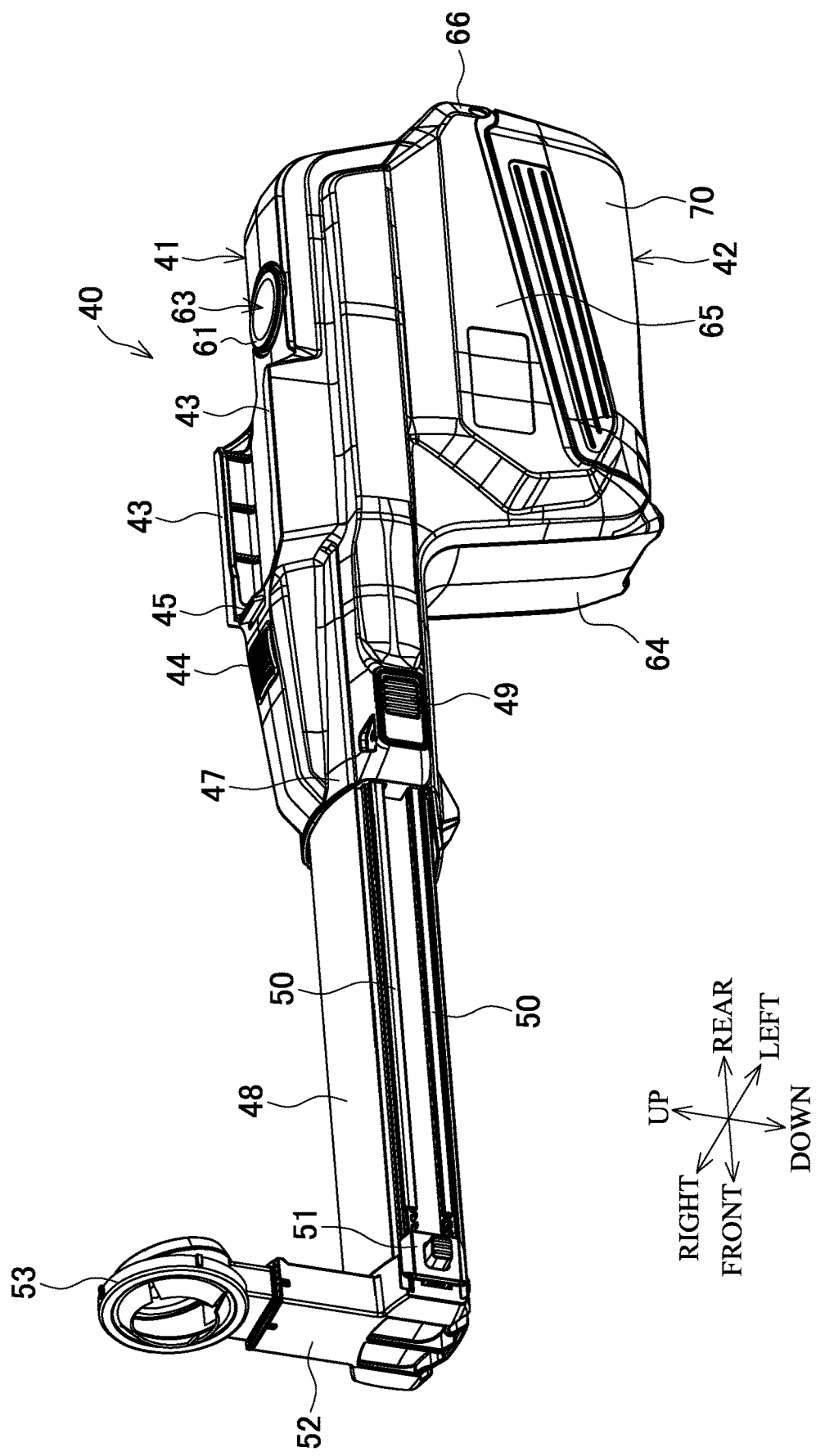
FIG. 4 is a perspective view of the dust collector for electric power tool.
Figure 5:
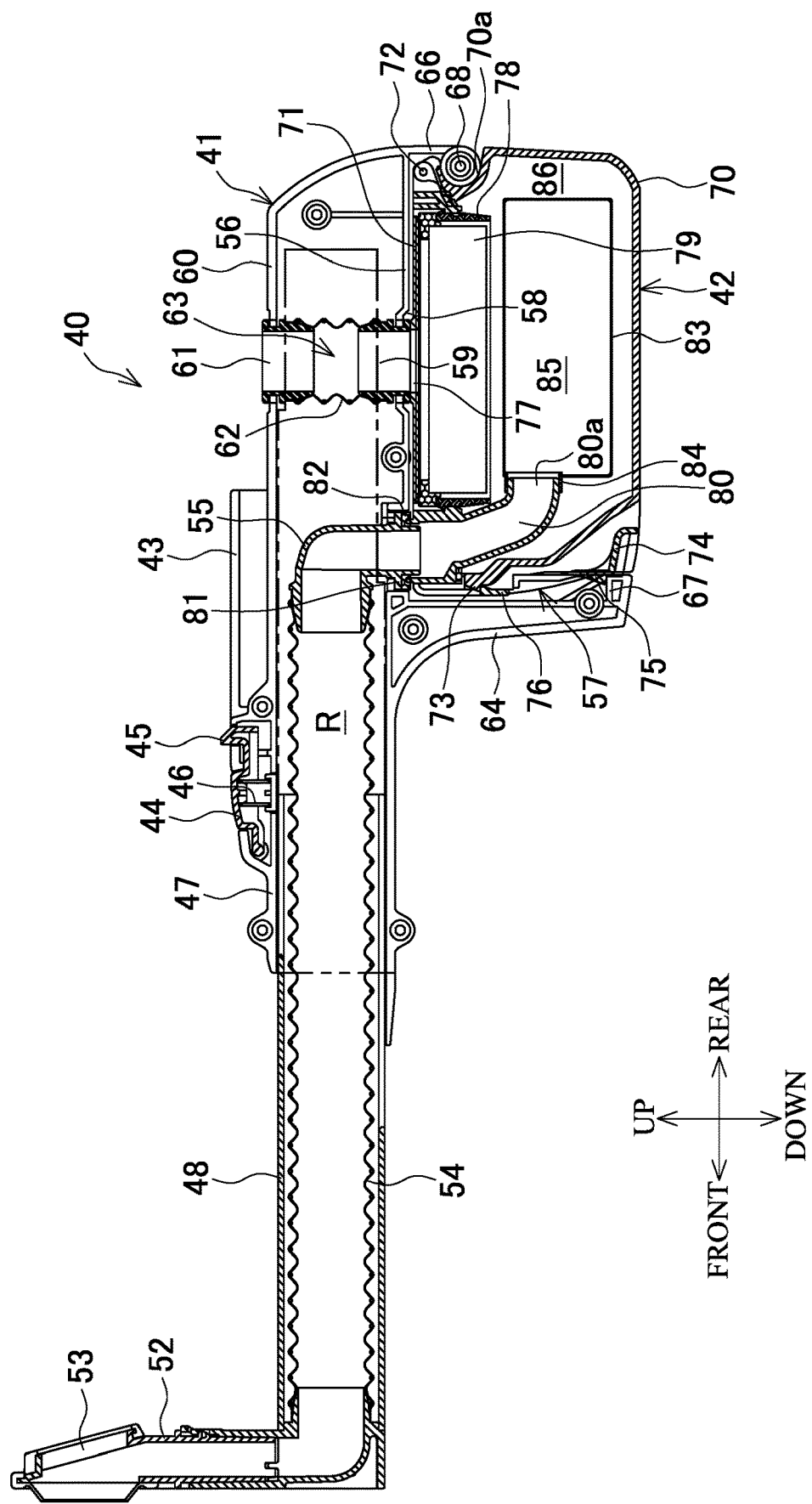
FIG. 5 is a center vertical cross-sectional view of the dust collector for electric power tool.

The dust collector 40 includes a box-shaped casing 41 that is formed by assembling right and left half casings and extends in the front-rear direction as illustrated in FIG. 4 and FIG. 5. A dust box 42 as a dust collection portion is attachably and detachably mounted in a lower side of the casing 41. The casing 41 has an upper portion on which a pair of right and left guide rails 43 are formed. The rails 34 of the hammer drill 1 can fit between the guide rails 43 from behind. Ahead of the guide rails 43 an operating button 44 is disposed. The operating button 44 includes a hook 45 that is engageable with the locking recess 35 at a rear end. The operating button 44 is biased to an upper limit posture by a coil spring 46 disposed in a lower side, so that the hook 45 projects upward.

The casing 41 has a front side upper portion on which a pipe-shaped guiding portion 47 with an opening front end is formed facing forward. The guiding portion 47 has a slide tube 48 slidably inserted in the front-rear direction. The slide tube 48 is held in a state of being retained by a lock button 49 disposed on a side surface of the guiding portion 47. Further, the slide tube 48 is held in a state of being stopped from rotating by slide rails 50 that are disposed on a side surface and are fitted to the guiding portion 47. The slide tube 48 has a side surface front end on which a stopper 51 that restricts a push-in position of the slide tube 48 is disposed so that a front-rear position is adjustable along the slide rails 50. Furthermore, an L-shaped nozzle 52 whose distal end faces upward is coupled to the front end of the slide tube 48. The nozzle 52 has a distal end on which a ring-shaped suction opening 53 is formed. The bit B coaxially passes through the suction opening 53.

The guiding portion 47 and the slide tube 48 internally house a front flexible hose 54 whose front end is connected to a lower end of the nozzle 52. The front flexible hose 54 has a rear end connected to an upper end facing frontward of an elbow 55 as an L-shaped pipe. The elbow 55 has a lower end that passes through a partition wall 56 that closes a lower surface of the casing 41 and projects into a joint 57 of the dust box 42 formed in a lower side of the partition wall 56.

At the rear of the elbow 55 in the casing 41, a lower pipe 59 and an upper pipe 61 are combined to be coaxial with one another. The lower pipe 59 passes through a depressed portion 58 formed on the partition wall 56 and has a lower end projecting into the depressed portion 58. The upper pipe 61 passes through an upper plate portion 60 of the casing 41 and has a projecting upper end. Furthermore, between the lower pipe 59 and the upper pipe 61, a rear flexible hose 62 whose both ends are externally mounted to the respective lower pipe 59 and upper pipe 61 is disposed in an up and down direction. The lower pipe 59 and the upper pipe 61, and the rear flexible hose 62 form the suction passage 63 that passes through the casing 41 in the up and down direction.

The joint 57 of the dust box 42 is formed surrounded by a front wall portion 64, a pair of right and left side wall portions 65, 65, and a rear wall portion 66. The front wall portion 64 projects downward in a front side with respect to a lower end of the elbow 55. The side wall portions 65, 65 are integrally formed striding across right and left end edges of the front wall portion 64 and right and left end edges of the partition wall 56. The side wall portions 65, 65 have lower ends that get gradually shorter as approaching rearward. The rear wall portion 66 projects downward from a rear end of the partition wall 56 and is shorter than the front wall portion 64. The front wall portion 64 has a lower end on which a lock protrusion 67 lockable with a protrusion 75, which will be described later, of the dust box 42 is disposed to protrude rearward. The rear wall portion 66 has a lower end front side on which a receiving shaft 68 in the right-left direction is formed.

Figure 6:
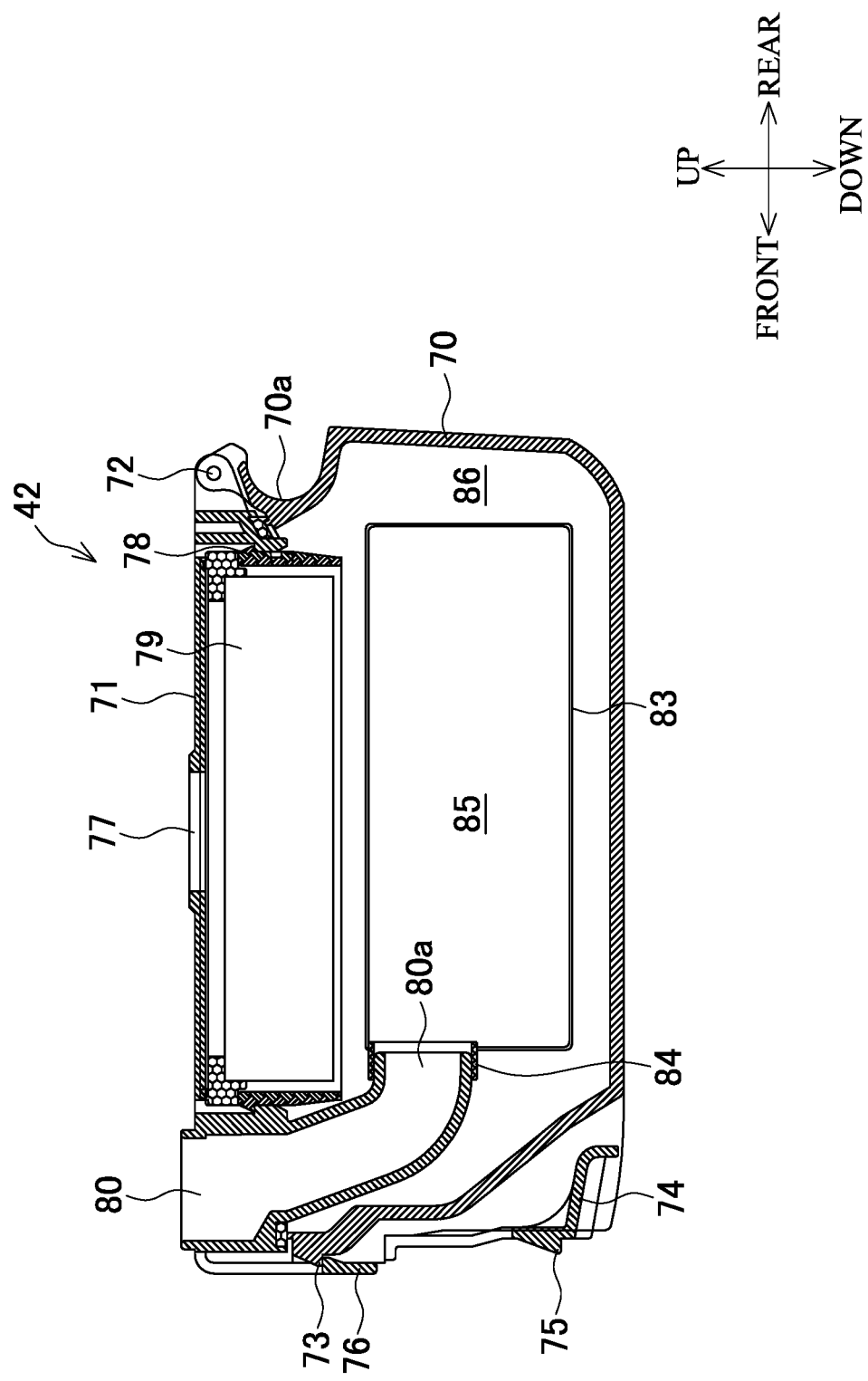
FIG. 6 is a center vertical cross-sectional view of the dust box.

As illustrated in FIG. 6, the dust box 42 includes a box main body 70 in a deep bottomed box shape and a lid body 71 in a rectangular shape. The box main body 70 has a top surface that opens. The lid body 71 is rotatably combined to an open and rear side of the box main body 70 with a hinge shaft 72. It should be noted that the dust box 42 alone is also described in front and rear, right and left, and up and down directions identical to a state where the dust box 42 is mounted on the hammer drill 1.

First, on a rear surface of the box main body 70 and under the hinge shaft 72, a groove 70a to which the receiving shaft 68 of the rear wall portion 66 is fittable is disposed to depress in the right-left direction. On a front surface upper side of the box main body 70, a locking projection 73 is formed and an upper end of an operating piece 74 is connected. The operating piece 74 is an L-shaped elastic piece that is folded backward after descending along a front surface of the box main body 70. The operating piece 74 has a front surface on which the protrusion 75 that is lockable to the lock protrusion 67 of the front wall portion 64 is formed.

Next, the lid body 71 has a front side end portion on which a loop-shaped lock portion 76 is disposed. The lock portion 76 engages with the locking projection 73 on the front surface of the box main body 70 in a state where the opening of the box main body 70 is closed, so that the closed state is maintained. The lid body 71 has an outlet 77 formed at a position closer to the rear. The outlet 77 communicates with the lower pipe 59 in a joined state to the joint 57. The lid body 71 has a lower surface on which a frame-shaped filter housing portion 78 is mounted in a state of covering the outlet 77 from the lower side. The filter housing portion 78 holds a filter 79 made of a paper as a second filter folded in the right-left direction in a state where a peak and a valley of a fold is in a front-rear direction. The filter housing portion 78 has a lower end formed to be short in the up and down direction such that the lower end is positioned in an upper side with respect to a position at a half the depth of the box main body 70.

Figure 7:
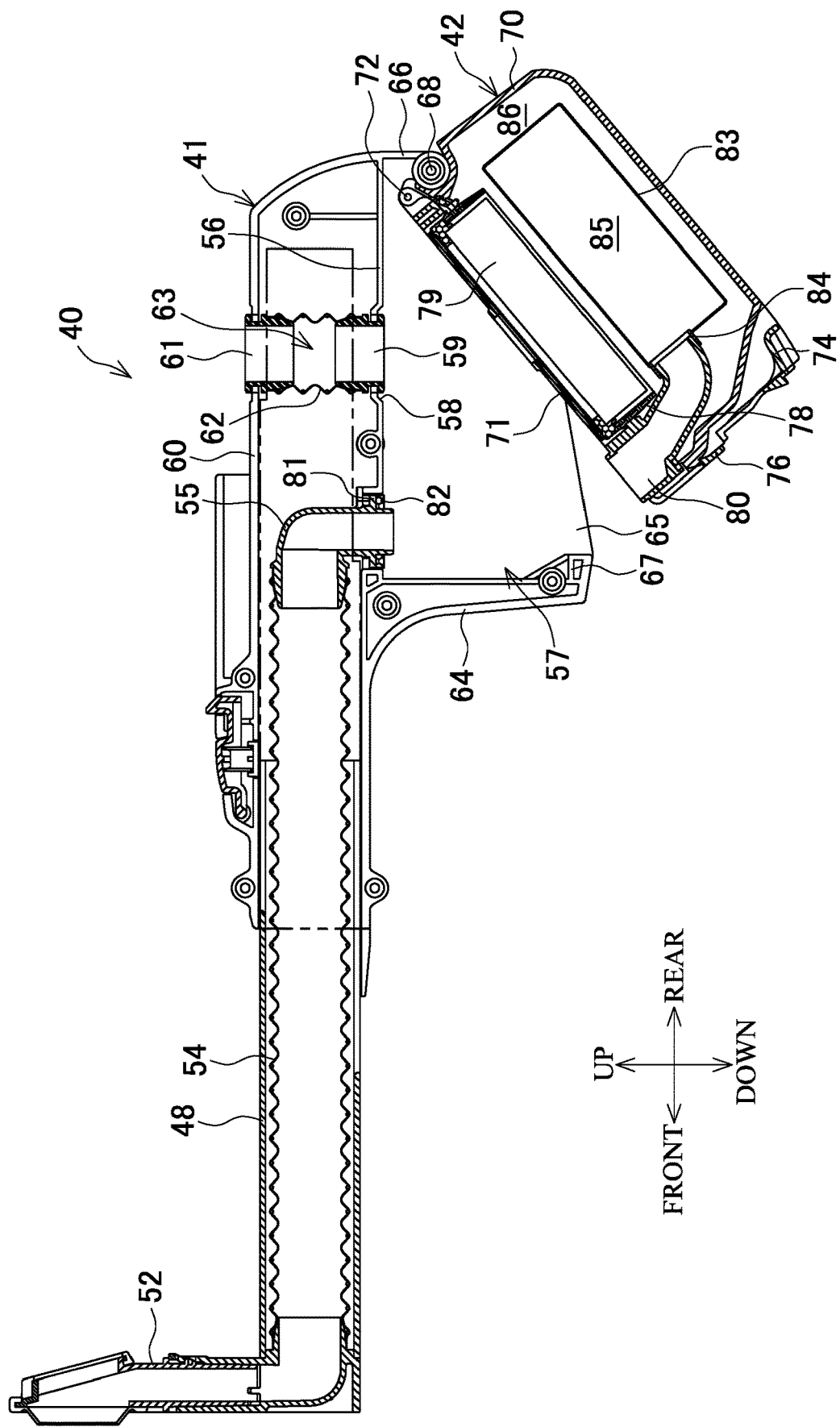
FIG. 7 is an explanatory drawing of the dust collector for electric power tool illustrating a state where the dust box is attached and removed.

In a front side of the filter housing portion 78 in the lid body 71, a duct 80 is disposed. The duct 80 is held between the lock portion 76 and the filter housing portion 78 and has an upper end projecting upward from the lid body 71. The duct 80 is externally mounted to a lower end of the elbow 55 in a state of being mounted to the joint 57. The elbow 55 has a lower end outer periphery on which a flange 81 is formed as illustrated in FIG. 5 and FIG. 7. The flange 81 receives an upper end of the duct 80 via a sealing material 82 such as a sponge.

Meanwhile, the duct 80 has an intermediate portion that extends obliquely rearward to the lower side of the filter housing portion 78. The duct 80 has a lower end 80a that opens rearward in the lower side of the filter housing portion 78. A bag-shaped filter 83 as a first filter is attachably and detachably connected to the lower end 80a. The bag-shaped filter 83 is formed of a paper coarser than the filter 79, and a connection cylinder 84 made of a paper such as a cardboard disposed in the opening is externally mounted to the lower end 80a of the duct 80 from the rear. Thus, the bag-shaped filter 83 is connected in a posture extending in the front-rear direction under the filter housing portion 78. Accordingly, in the dust box 42, a first dust collecting chamber 85 and a second dust collecting chamber 86 are each independently formed. The first dust collecting chamber 85 communicates with the duct 80 and is partitioned in the bag-shaped filter 83. The second dust collecting chamber 86 includes the filter housing portion 78 and is partitioned by the box main body 70 and the lid body 71.

When the dust box 42 thus formed is mounted to the joint 57, in a state where the lock portion 76 is locked to the locking projection 73 and the lid body 71 is closed, the lock portion 76 is caused to face forward and the lid body 71 is caused to face upward, and then, the groove 70a is caused to fit to the receiving shaft 68 of the joint 57 from a front lower side (FIG. 7). When the dust box 42 is pushed into the joint 57 such that the dust box 42 is raised upward from the oblique posture, the protrusion 75 of the operating piece 74 is locked to the lock protrusion 67, and thus, the dust box 42 is mounted to the joint 57. In this mounting state, the upper end of the duct 80 engages with the lower end of the elbow 55 to connect the duct 80 to the elbow 55, and the outlet 77 abuts on the lower end of the lower pipe 59 to communicate with the suction passage 63. Thus, inside the dust collector 40, a dust collecting route R is formed. The dust collecting route R reaches the suction passage 63 by passing in the order from the suction opening 53, then, through the nozzle 52, the front flexible hose 54, and the elbow 55, into the dust box 42, and then, through the duct 80, the bag-shaped filter 83 (the first dust collecting chamber 85), the second dust collecting chamber 86, and the filter 79.

In the hammer drill 1 and the dust collector 40 configured as described above, when the dust collector 40 is mounted on the hammer drill 1, in a state where the guide rails 43 of the casing 41 are positioned ahead of the rails 34 of the hammer drill 1, any ones of the rails 34 or the guide rails 43 is slid in the front-rear direction such that the rails 34, 34 fit between the guide rails 43. Then, the rails 34 fit between the guide rails 43 and are combined to the guide rails 43, and the hook 45 of the operating button 44 is locked into the locking recess 35, and thus, the mounting is completed. At this time, the upper pipe 61 of the casing 41 is closely in contact with the connection port 16 of the intermediate housing 5 to communicate the suction passage 63 to the intake air chamber 18.

In a set state where the suction opening 53 is pressed against a surface to be processed of a workpiece, the switch is turned on by performing a push-in operation of the switch lever 9 of the hammer drill 1, then, the motor 3 is driven to rotate the output shaft 4 to rotate the intermediate shaft 20. At this time, a switching knob 36 (FIG. 1 and FIG. 3) disposed on the side surface of the main body housing 6 is operated to slide the clutch 23 to select any one of an advance position, a retreated position, and an intermediate position. The advance position is where the clutch 23 engages only with the first gear 22, a retreated position is where the clutch 23 engages only with the boss sleeve 24, and an intermediate position is where the clutch 23 simultaneously engages with the first gear 22 and the boss sleeve 24. Thus, a selection of a drill mode, a hammer mode, and a hammer drill mode can be made. The drill mode is a mode in which the tool holder 25 rotates via the second gear 32 to rotate the bit B. The hammer mode is a mode in which the piston cylinder 26 is caused to reciprocate by a swing of the arm 28 and the striker 30 in conjunction with the piston cylinder 26 hammers the bit B via the impact bolt 31. The hammer drill mode is a mode in which the rotation of the tool holder 25 and the hammering of the impact bolt 31 are simultaneously performed. When the hammer drill 1 is caused to make a forward movement in a state where the suction opening 53 is set, the slide tube 48 retreats together with the nozzle 52, and the bit B passes through the suction opening 53 to be able to process the workpiece.

The rotation of the output shaft 4 rotates the fan for dust collection 13 together with the fan for motor cooling 12. Therefore, the pressure in the dust collecting route R communicated with the intake air chamber 18 becomes a negative pressure, and thus, the external air is suctioned from the suction opening 53. The suctioned external air passes from the nozzle 52, then, through the front flexible hose 54 and the elbow 55 to enter into the dust box 42 from the duct 80. The suctioned external air then passes through the bag-shaped filter 83 and the filter 79 in this order to get to the intake air chamber 18 via the suction passage 63 from the outlet 77, and then, is discharged outside from the exhaust outlet. Accordingly, dust generated from the workpiece is suctioned into the suction opening 53 to enter into the dust box 42 via the nozzle 52 and the front flexible hose 54, and the elbow 55, and is captured by the bag-shaped filter 83 when the dust passes through the bag-shaped filter 83 from the duct 80 to be accumulated inside the first dust collecting chamber 85. Fine dust that has passed through the bag-shaped filter 83 is captured by the fine filter 79 and is accumulated inside the second dust collecting chamber 86.

For a removal of the dust collector 40, the lock of the hook 45 to the locking recess 35 is released by pushing the operating button 44 in. In this state, conversely from the time of mounting, any one of the hammer drill 1 and the dust collector 40 is slid in a direction separating from the other to disengage the rails 34 from the guide rails 43, thus completing the removal.

Meanwhile, when the dust accumulated in the dust box 42 is disposed, the operating piece 74 is pressed down to release the lock between the protrusion 75 and the lock protrusion 67. In this state, as illustrated in FIG. 7, the upper side of the dust box 42 is pressed downward about the receiving shaft 68, thus removing the dust box 42 from the joint 57.

Figure 8:
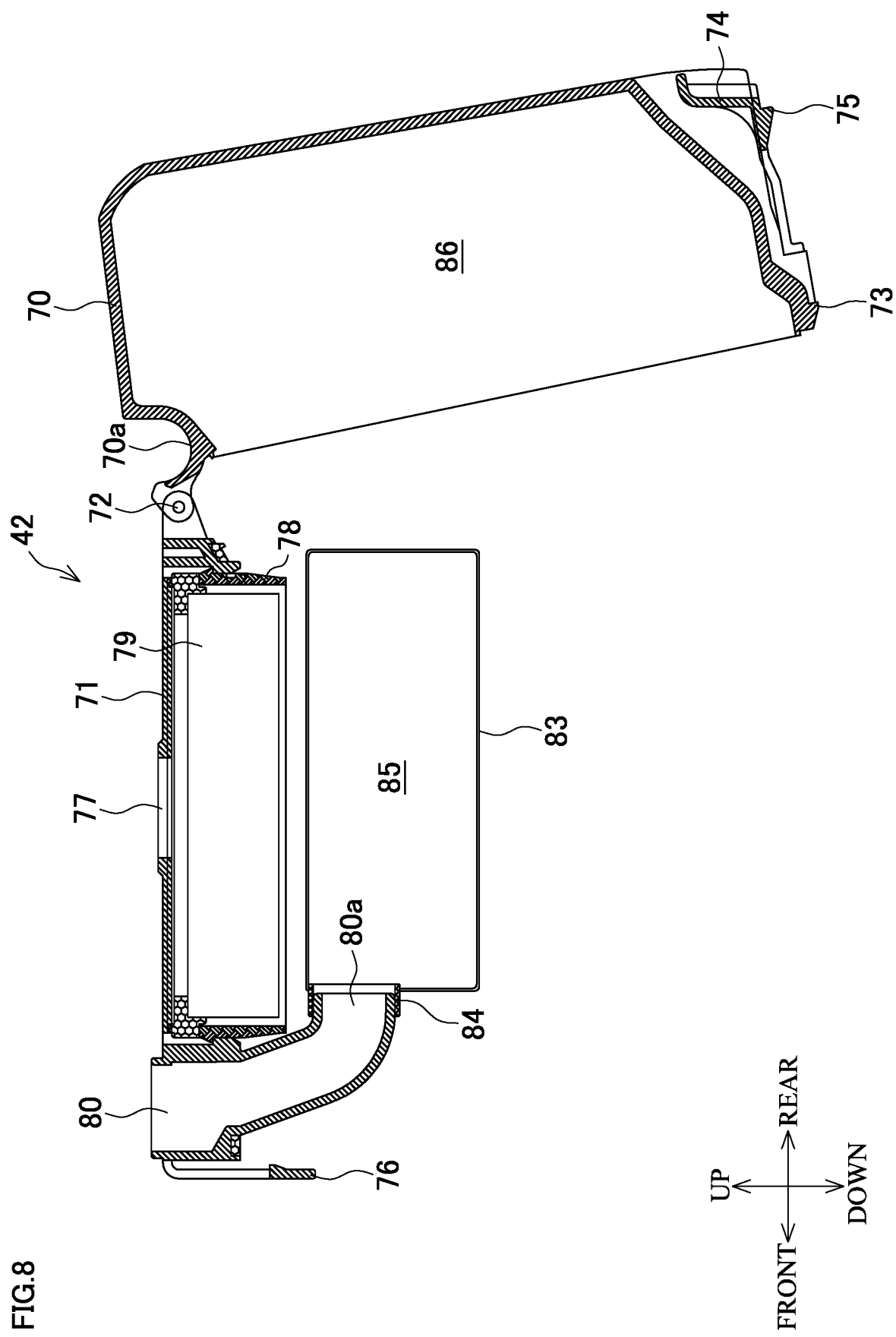
FIG. 8 is an explanatory drawing of the dust box with a lid body open.
Figure 9:
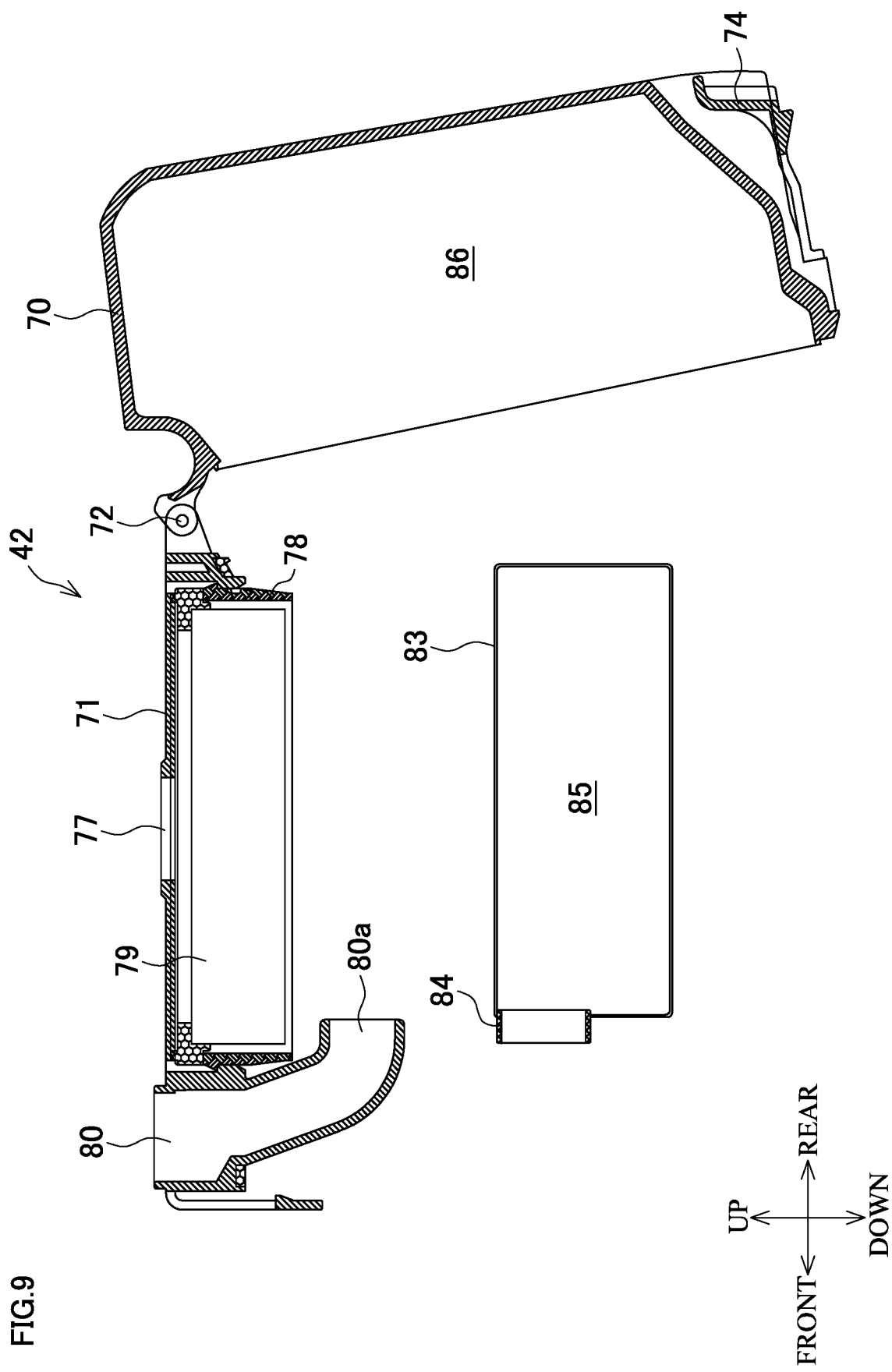
FIG. 9 is an explanatory drawing of the dust box with a bag-shaped filter removed.

Next, the lock portion 76 of the lid body 71 is disengaged from the box main body 70 and the lid body is opened 71, then, the bag-shaped filter 83 is exposed as illustrated in FIG. 8. Accordingly, as illustrated in FIG. 9, the connection cylinder 84 of the bag-shaped filter 83 is removed from the lower end 80*a* of the duct 80, the dust inside the first dust collecting chamber 85 can be disposed from the connection cylinder 84. It is also possible to dispose the dust together with the bag-shaped filter 83 and replace with the new bag-shaped filter 83. Furthermore, when the dust is accumulated within the second dust collecting chamber 86 of the box main body 70, the dust can be disposed from the opening of the box main body 70.

Thus, with the dust collector 40 and the hammer drill 1 in the above-described configuration, the bag-shaped filter 83, which internally includes the first dust collecting chamber 85 partitioned inside the dust box 42, and the filter 79, which is arranged outside the bag-shaped filter 83 independently from the bag-shaped filter 83, are each disposed on the dust collecting route R in the dust box 42. Therefore, the dust can be collectively accumulated in the first dust collecting chamber 85 within the bag-shaped filter 83. Accordingly, scattering of the dust at a time of disposal can be effectively reduced.

Here in particular, since the bag-shaped filter 83 is disposed on the upstream side in the dust collecting route R with respect to the filter 79, a significant portion of the dust can be accumulated in the bag-shaped filter 83, thereby being more preferable in preventing the scattering.

Since the bag-shaped filter 83 is coarser than the filter 79, clogging is prevented, thereby ensuring maintaining air permeability of the bag-shaped filter 83.

Furthermore, since the bag-shaped filter 83 is removably attachable to the dust box 42, the dust can be easily disposed together with the bag-shaped filter 83.

In addition, since the bag-shaped filter 83 is made of a paper, the bag-shaped filter 83 is disposable.

Meanwhile, the dust collection portion is the dust box 42 mounted on the casing 41 as a separate body, a part of the dust collecting route R is formed in the dust box 42, and the duct 80 to which the opening (connection cylinder 84) of the bag-shaped filter 83 is connected is disposed. Therefore, the bag-shaped filter 83 is easily attached and removed.

Since the casing 41 includes the suction passage 63 for obtaining a suctioning force from the hammer drill 1 in a mounted state on the hammer drill 1, for example, a motor for dust collection is not necessary, and thus, the dust collector 40 can be manufactured at a low cost and a weight reduction is also achievable.

In the above-described configuration, while the first filter (the bag-shaped filter 83) is disposed under the second filter (the filter 79), the first filter may be disposed in a front side and the second filter may be disposed in a rear side depending, for example, on a shape of a dust box. In this case, it is allowed to shorten the duct, or omit the duct such that a direct connection to the elbow is made.

Figure 10:
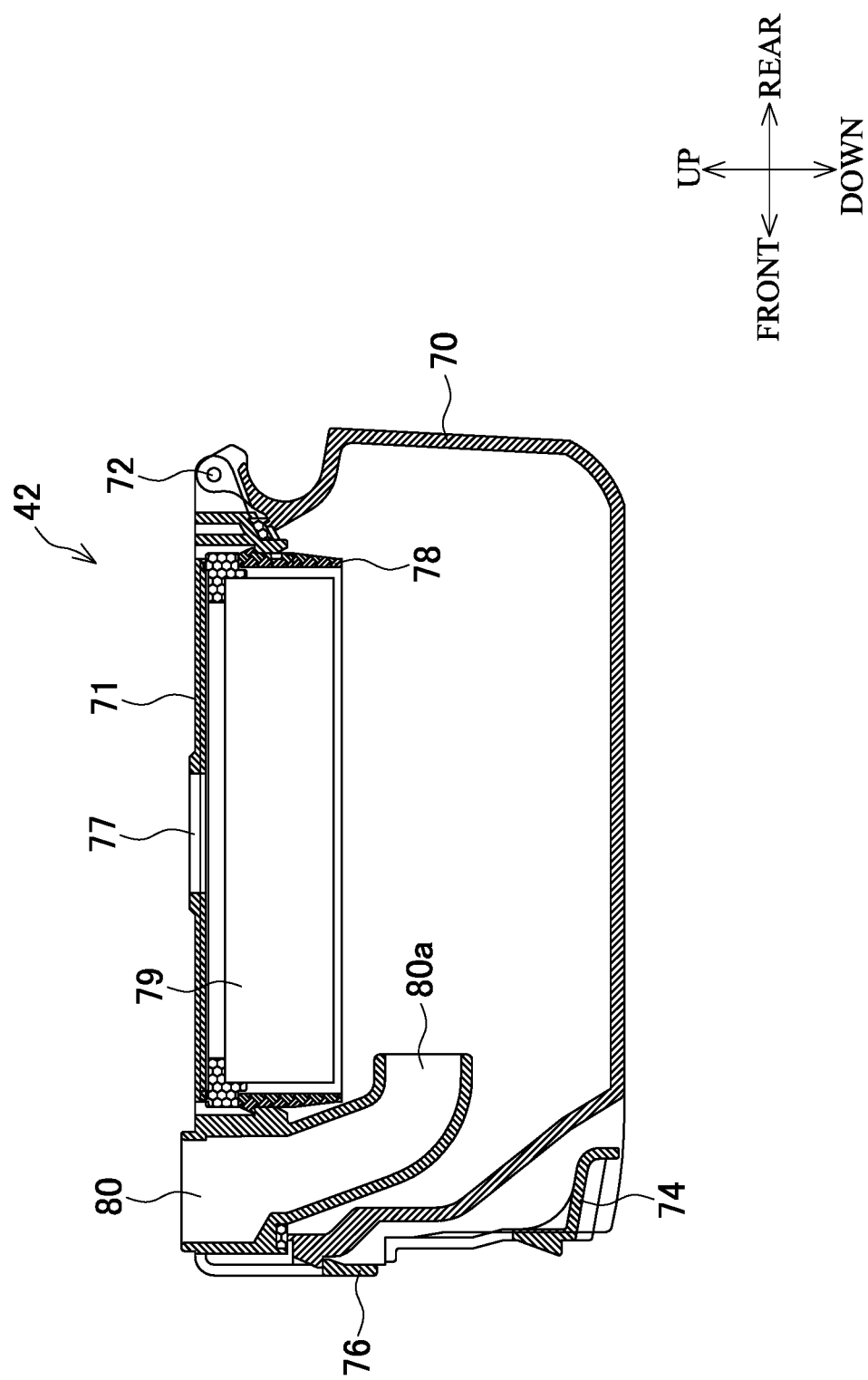
FIG. 10 is an explanatory drawing of the dust box with the bag-shaped filter removed.

A coupling structure between the first filter and the duct or the elbow is not limited to the above-described configuration, and it is possible to employ a locking structure such as a bayonet and to employ a joint member such as a clip. The first filter being removably attachable can select a usage in which the first filter is not mounted as illustrated in FIG. 10.

Furthermore, in the above-described configuration, the first filter and the second filter are disposed on an upstream side and a downstream side of the dust collecting route, respectively. Conversely to this, it is possible to dispose the second filter and the first filter on the upstream side and the downstream side of the dust collecting route, respectively.

Meanwhile, the dust collector is also not limited to the structure that causes the suction passage to communicate with the intake air chamber of the hammer drill as described above. For example, instead of the suction passage, within the casing, it is allowed to obtain the suctioning force in the following manner. The motor for dust collection that includes the fan for dust collection is disposed, and respective terminals, which are electrically connected to one another in a joined state of the hammer drill and the dust collector, are also disposed on the hammer drill and the dust collector. Then, the motor for dust collection is driven by the electric power supply from a side of the electric power tool to obtain the suction force.

The dust box as the separate body from the casing is employed as the dust collection portion in the above-described configuration. However, the first and second filters may be internally disposed by integrally forming the dust collecting chamber with a lid in the casing itself.

Other than above, the configuration of the hammer drill can have appropriate changes in, for example, a direction and a kind of the motor, and a structure of the output unit. Instead of a power supply cord, a DC machine including a battery pack may be used.

Not limited to the hammer drill, the disclosure is applicable to other electric power tools such as an electric drill.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collector for electric power tool, the dust collector comprising:
    a casing mountable to the electric power tool;
    a ring-shaped suction opening disposed to protrude forward from the casing, a tool bit of the electric power tool being insertable into the suction opening in a state where the suction opening is brought into contact with a surface to be processed;
    a dust collecting route formed within the casing, the dust collecting route guiding air suctioned from the suction opening to a dust collection portion disposed in the casing; and
    a first filter and a second filter disposed in the dust collection portion on the dust collecting route, the first and second filters being configured to capture dust suctioned with the air, wherein:
    the first filter internally includes a first dust collecting chamber partitioned inside the dust collection portion,
    the second filter is arranged outside the first filter independently from the first filter, and
    the dust collection portion further comprises a second dust collecting chamber (i) that is located on the dust collecting route between the first filter and the second filter and (ii) that collects dust captured by the second filter.

2. The dust collector for electric power tool according to claim 1, wherein
    the first filter is disposed on an upstream side on the dust collecting route with respect to the second filter.

3. The dust collector for electric power tool according to claim 2, wherein
    the first filter is coarser than the second filter.

4. The dust collector for electric power tool according to claim 1, wherein
    the first filter is removably attachable to the dust collection portion.

5. The dust collector for electric power tool according to claim 1, wherein
    the first filter is made of a paper.

6. The dust collector for electric power tool according to claim 1, wherein
    the first filter has a bag shape.

7. The dust collector for electric power tool according to claim 6, wherein:
    the dust collection portion is a dust box mounted on the casing, and
    the dust box includes a part of the dust collecting route and a duct to which an opening of the first filter is connected.

8. The dust collector for electric power tool according to claim 7, wherein
    the first filter is disposed under the second filter in the dust box.

9. A dust collector for electric power tool, the dust collector comprising:
    a casing mountable to the electric power tool;
    a ring-shaped suction opening disposed to protrude forward from the casing, a tool bit of the electric power tool being insertable into the suction opening in a state where the suction opening is brought into contact with a surface to be processed;
    a dust collecting route formed within the casing, the dust collecting route guiding air suctioned from the suction opening to a dust collection portion, which is a dust box mounted on the casing; and
    a first filter and a second filter disposed in the dust collection portion on the dust collecting route, the first and second filters being configured to capture dust suctioned with the air, wherein:
    the first filter has a bag shape, is disposed under the second filter in the dust box, and internally includes a first dust collecting chamber partitioned inside the dust collection portion,
    the second filter is arranged outside the first filter independently from the first filter,
    the dust box includes a part of the dust collecting route and a duct to which an opening of the first filter is connected,
    the dust box includes a box-shaped box main body whose top surface opens by way of an opening and a lid body that closes the opening of the box main body,
    the first filter is housed within the box main body, and
    the second filter is disposed on the lid body.

10. The dust collector for electric power tool according to claim 9, wherein
    the second filter is made of a paper folded in a right-left direction in a state where a peak and a valley of a fold are in a front-rear direction.

11. The dust collector for electric power tool according to claim 1, wherein
    the casing includes a suction passage for obtaining a suctioning force from the electric power tool in a state where the electric power tool is mounted.

12. A dust collector for electric power tool, the dust collector comprising:
    a casing mountable to the electric power tool;

a ring-shaped suction opening disposed to protrude forward from the casing, a tool bit of the electric power tool being insertable into the suction opening in a state where the suction opening is brought into contact with a surface to be processed;

a dust collecting route formed within the casing, the dust collecting route guiding air suctioned from the suction opening to a dust collection portion disposed in the casing; and a first filter and a second filter disposed in the dust collection portion on the dust collecting route, the first and second filters being configured to capture dust suctioned with the air, wherein:

the first filter internally includes a first dust collecting chamber partitioned inside the dust collection portion, the second filter is arranged outside the first filter independently from the first filter, the casing includes a suction passage for obtaining a suctioning force from the electric power tool in a state where the electric power tool is mounted, the dust collection portion is disposed in a lower portion of the casing, and the suction passage includes a lower pipe, an upper pipe, and a flexible hose, the lower pipe having a lower end projecting toward a side of the dust collection portion, the upper pipe passing through an upper surface of the casing and having a projecting upper end, the flexible hose striding across and connected to the lower pipe and the upper pipe.

13. An electric power tool comprising the mounted dust collector for electric power tool according to claim 1.

* * * * *